US012580147B2

(12) United States Patent
Ishii et al.

(10) Patent No.: US 12,580,147 B2
(45) Date of Patent: Mar. 17, 2026

(54) X-RAY TUBE

(71) Applicant: HAMAMATSU PHOTONICS K.K., Hamamatsu (JP)

(72) Inventors: Atsushi Ishii, Hamamatsu (JP); Akimichi Shimizu, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 158 days.

(21) Appl. No.: 18/413,829

(22) Filed: Jan. 16, 2024

(65) Prior Publication Data

US 2024/0274392 A1 Aug. 15, 2024

(30) Foreign Application Priority Data

Feb. 15, 2023 (JP) ................................. 2023-021854

(51) Int. Cl.
*H01J 35/06* (2006.01)
*H01J 35/14* (2006.01)

(52) U.S. Cl.
CPC ............ *H01J 35/066* (2019.05); *H01J 35/14* (2013.01)

(58) Field of Classification Search
CPC .... H01J 35/066; H01J 35/14; H01J 2235/205; H01J 29/563; H01J 29/58; H01J 31/50; H01J 37/15; H01J 37/04; H01J 31/04; H01J 37/147; H01J 2237/032; H01J 2237/1502; H01J 2229/58; H01J 2237/0835; H01J 35/30; H01J 35/153; H01J 35/16; H01J 35/32; H01J 2235/166; H01J 2235/086; H01J 35/18; H01J 35/04; H01J 2235/1204; H01J 2235/167; H01J 35/186; H01J 2235/122; H01J 2235/1291; H01J 35/116; H01J 2235/1262; H01J 2235/06; H01J 2235/1216; H01J 2235/16; H01J 2235/18; H01J 2235/163; H01J 2235/164; H01J 35/06; H01J 35/064; H01J 2235/168; H01J 2235/186; H01J 35/065; A61N 5/1001; A61N 5/1014; A61N 2005/1022; A61N 5/0601; A61N 2005/0609; A61N 2005/0654; A61N 2005/0651; A61N 2005/0661; A61M 25/0108; A61B 18/24; A61B 2017/22051; A61B 2018/00982;

(Continued)

(56) References Cited

U.S. PATENT DOCUMENTS 6,319,188 B1 * 11/2001 Lovoi ..................... H01J 35/32 600/3
2006/0126788 A1 * 6/2006 Engel .................. A61N 5/1001 378/119
2009/0161830 A1 * 6/2009 Inazuru .................. H01J 35/18 378/138

FOREIGN PATENT DOCUMENTS

JP H11-167887 A 6/1999
JP 2012-256441 A 12/2012
JP 2014-136083 A 7/2014

(Continued)

*Primary Examiner* — Irakli Kiknadze
(74) *Attorney, Agent, or Firm* — Faegre Drinker Biddle & Reath LLP

(57) ABSTRACT

An X-ray tube includes a housing, a cathode disposed in the housing and configured to release electrons, a target disposed in the housing and configured to generate X-rays upon incidence of the electrons, a first tubular body surrounding the cathode inside the housing, and a getter disposed in a region where a trajectory of the electrons from the cathode to the target is not allowed to be seen in an inner region of the first tubular body.

9 Claims, 4 Drawing Sheets

(58) Field of Classification Search
CPC .. A61B 2018/2261; H05G 1/025; H05G 1/32; G21K 5/10; G01N 23/04
USPC ........................................................ 378/136
See application file for complete search history.

(56) References Cited

FOREIGN PATENT DOCUMENTS

| | | | |
|---|---|---|---|
| JP | 2014-220096 | A | 11/2014 |
| JP | 2017-004749 | A | 1/2017 |
| JP | 2017-054643 | A | 3/2017 |
| JP | 2017-228505 | A | 12/2017 |

* cited by examiner

X-RAY TUBE

TECHNICAL FIELD

The present disclosure relates to an X-ray tube.

BACKGROUND

There has been a known X-ray tube including a housing, a cathode that releases electrons in the housing, and a target that generates X-rays in the housing by incidence of electrons. As such an X-ray tube, Japanese Unexamined Patent Publication No. 2012-256441 describes an X-ray tube including a getter for adsorbing gas generated in the housing.

SUMMARY

However, in the X-ray tube described in Japanese Unexamined Patent Publication No. 2012-256441, the getter is disposed in a space inside the housing and outside an electron gun that accommodates the cathode. Therefore, there is concern that gas released from a member near the cathode may adhere to the cathode before being adsorbed by the getter. When gas adheres to the cathode, the cathode deteriorates and electrons are less likely to be released from the cathode.

An object of the present disclosure is to provide an X-ray tube capable of suppressing deterioration of the cathode.

An X-ray tube of an aspect of the present disclosure includes a housing, a cathode disposed in the housing and configured to release electrons, a target disposed in the housing and configured to generate X-rays upon incidence of the electrons, a first tubular body surrounding the cathode inside the housing, and a getter disposed in a region where a trajectory of the electrons from the cathode to the target is not allowed to be seen in an inner region of the first tubular body.

DETAILED DESCRIPTION

Figure 1:
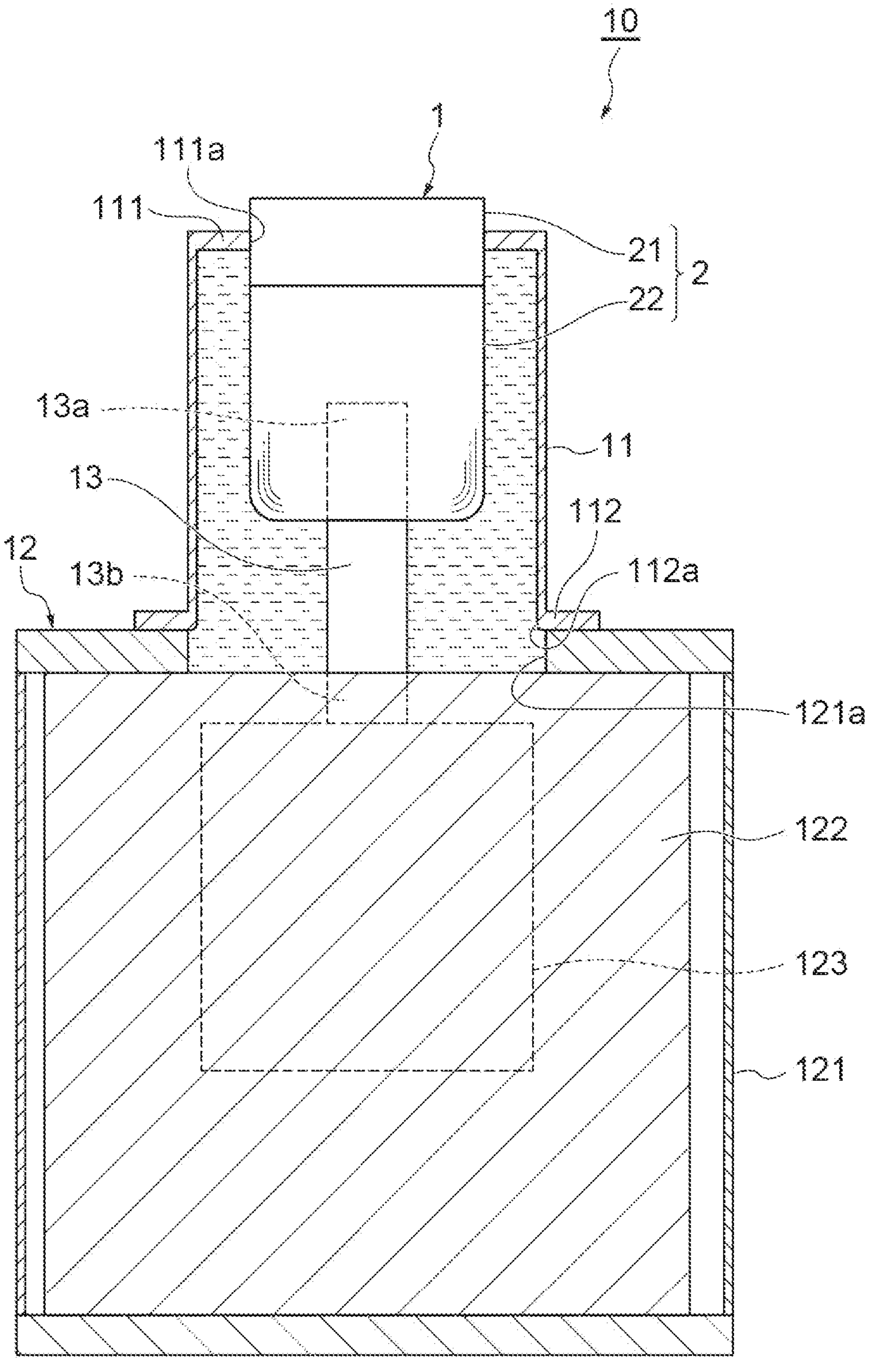
FIG. 1 is a cross-sectional view of an X-ray generator including an X-ray tube according to one embodiment.

Hereinafter, embodiments of the present disclosure will be described in detail with reference to the drawings. Note that, in each figure, the same or corresponding parts are denoted by the same reference numerals, and a redundant description will be omitted.

[Configuration of X-Ray Generator]

As illustrated in FIG. 1, an X-ray generator 10 includes an X-ray tube 1, a holder 11, a power supply 12, and a power feeder 13. In this embodiment, the X-ray generator 10 is configured as a microfocus X-ray source used for non-destructive X-ray inspection.

The holder 11 holds the X-ray tube 1. The holder 11 is made of metal and has a tubular shape. The X-ray tube 1 is fluid-tightly attached to one end 111 of the holder 11. More specifically, while a head 21 in the housing 2 of the X-ray tube 1 is disposed inside an opening 111*a* of the one end 111, and a valve 22 in the housing 2 of the X-ray tube 1 is disposed inside the holder 11, the head 21 is fluid-tightly attached to the one end 111. The power supply 12 is fluid-tightly attached to the other end 112 of the holder 11. Insulating oil is sealed inside the holder 11.

The power supply 12 generates a high voltage to be applied to the X-ray tube 1. The power supply 12 includes a power supply case 121, an insulating block 122, and a booster 123. The power supply case 121 accommodates the insulating block 122 and the booster 123. The power supply case 121 is made of metal and has a box shape. The booster 123 is embedded in the insulating block 122. The insulating block 122 is formed into a block shape using an insulating material (for example, epoxy resin, etc.). The booster 123 boosts a voltage introduced from outside the X-ray generator 10 to generate a high voltage.

The power feeder 13 supplies power from the power supply 12 to the X-ray tube 1. The power feeder 13 has a plurality of pieces of wiring. The power feeder 13 extends from the booster 123 to the X-ray tube 1 via an opening 121*a* of the power supply case 121 and an opening 112*a* of the other end 112 of the holder 11. One end 13*a* of the power feeder 13 is electrically connected to the X-ray tube 1. The other end 13*b* of the power feeder 13 is electrically connected to the booster 123.

[Configuration of X-Ray Tube]

Figure 2:
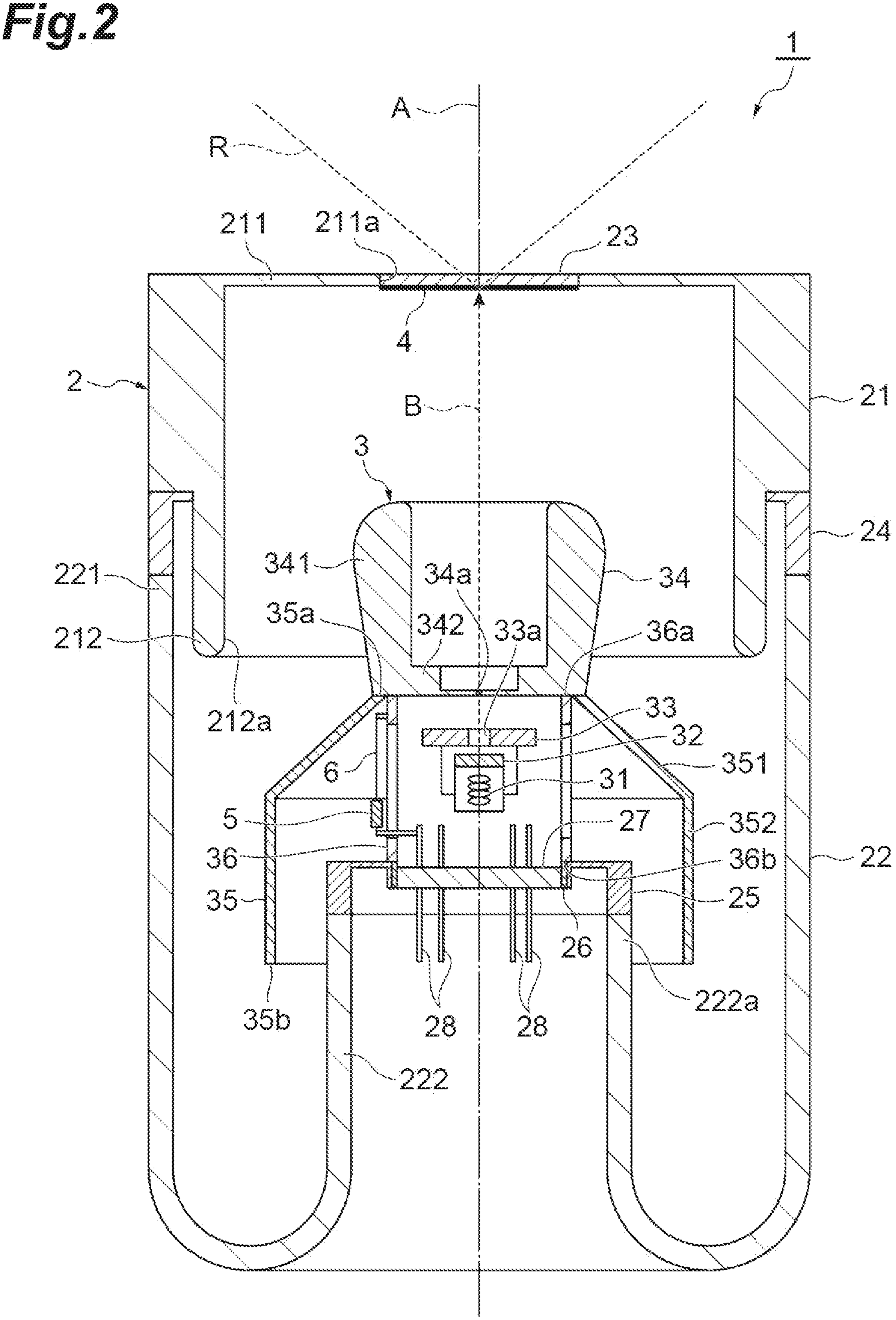
FIG. 2 is a cross-sectional view of the X-ray tube illustrated in FIG. 1.

As illustrated in FIG. 2, the X-ray tube 1 includes the housing 2, an electron gun 3, a target 4, and a getter 5. In this embodiment, the X-ray tube 1 is configured as a sealed transmission type X-ray tube that does not require replacement of parts.

The housing 2 accommodates the electron gun 3, the target 4, and the getter 5. A space inside the housing 2 is a space where vacuuming has been performed. The housing 2 includes a head 21, a valve 22, and a window member 23. The head 21 is made of metal (for example, stainless steel, copper, copper alloy, iron alloy, etc.) and is formed in a tubular shape with a tube axis A as a center line. The valve 22 is made of an insulating material (for example, glass, ceramic, etc.) and is formed in a tubular shape whose center line is the tube axis A. The window member 23 is made of an X-ray transparent material (for example, beryllium, aluminum, diamond, etc.) and is formed in a plate shape whose center line is the tube axis A.

The window member 23 is airtightly attached to one end 211 of the head 21 while blocking an opening 211*a* of the one end 211 of the head 21. One end 221 of the valve 22 is airtightly attached to the head 21 via a valve flange 24 made of metal (for example, Kovar, etc.) while an opening 212*a* of the other end 212 of the head 21 is disposed inside the valve 22. The other end of the valve 22 is folded back inward to form an inner tubular portion 222. A stem 27 is airtightly attached to an end 222*a* of the inner tubular portion 222 via a stem flange 26 and a valve flange 25 made of metal (for example, Kovar, etc.). The stem 27 is made of an insulating material (for example, glass, ceramic, etc.) and is formed in a plate shape whose center line is the tube axis A.

The stem 27 is provided with a plurality of stem pins 28. Each of the stem pins 28 passes through the stem 27 while being electrically insulated from each other and maintaining airtightness. In the X-ray generator 10, the one end 13*a* of the power feeder 13 (see FIG. 1) is electrically connected to the plurality of stem pins 28 inside the inner tubular portion 222.

The electron gun 3 emits an electron beam B inside the housing 2. The electron gun 3 is disposed on the stem 27 inside the housing 2. The electron gun 3 includes a heater 31, a cathode 32, a current adjustment electrode 33, a focusing electrode 34, a first tubular body 35, a second tubular body 36, and a plurality of support members (not illustrated).

The heater 31 is disposed inside the housing 2. The heater 31 includes, for example, a filament that generates heat by electric conduction. The heater 31 is electrically connected to the corresponding stem pin 28.

The cathode 32 is disposed inside the housing 2. The cathode 32 is an indirectly heated cathode that releases electrons when heated by the heater 31. The indirectly heated cathode 32 is, for example, an impregnated cathode in which porous tungsten is impregnated with an oxide of an alkaline earth metal, and is formed in a plate shape whose center line is the tube axis A. The cathode 32 is electrically connected to a corresponding stem pin 28. Note that the cathode 32 is not limited to the indirectly heated cathode heated by the heater 31, and may be a directly heated cathode. The directly heated cathode 32 is electrically connected to the corresponding stem pin 28, and releases electrons by being heated by electric conduction to the cathode 32. The directly heated cathode 32 is, for example, a high melting point metal filament such as tungsten, a member made of lanthanum hexaboride ($LaB_6$), a member made of cerium hexaboride ($CeB_6$), etc.

The current adjustment electrode 33 is disposed inside the housing 2. The current adjustment electrode 33 is located on the window member 23 side with respect to the cathode 32. The current adjustment electrode 33 is made of metal (for example, molybdenum, etc.) and is formed in a plate shape whose center line is the tube axis A. A through hole 33*a* whose center line is the tube axis A is formed in the current adjustment electrode 33. The current adjustment electrode 33 adjusts the quantity of electrons released from the cathode 32. The current adjustment electrode 33 is electrically connected to the corresponding stem pin 28.

The focusing electrode 34 is disposed in housing 2. The focusing electrode 34 is located on the window member 23 side with respect to the current adjustment electrode 33. The focusing electrode 34 is made of metal (for example, molybdenum, etc.) and is formed in a tubular shape whose center line is the tube axis A. In this embodiment, the focusing electrode 34 has a side wall 341 and a bottom wall 342. The side wall 341 is formed in a cylindrical shape whose center line is the tube axis A. The bottom wall 342 is formed integrally with the side wall 341 at an end of the side wall 341 on the current adjustment electrode 33 side. A through hole 34*a* whose center line is the tube axis A is formed in the bottom wall 342. An inner diameter of the through hole 34*a* is, for example, about 0.3 to 0.5 mm. The focusing electrode 34 focuses electrons released from the cathode 32 to pass through the current adjustment electrode 33 onto the target 4 as an electron beam B. The focusing electrode 34 also functions as an extraction electrode that forms an electric field for extracting electrons included in the electron beam B.

The first tubular body 35 is disposed in the housing 2. The first tubular body 35 is made of metal (for example, stainless steel, etc.) and is formed in a tubular shape whose center line is the tube axis A. One end 35*a* of the first tubular body 35 in a direction parallel to the tube axis A is fixed to the focusing electrode 34, for example, by welding. In this embodiment, the first tubular body 35 has a first portion 351 including the one end 35*a* and a second portion 352 including the other end 35*b*. The first portion 351 is formed in a truncated conical tubular shape that widens toward the opposite side from the focusing electrode 34. The second portion 352 is formed in a cylindrical shape, and is formed integrally with the first portion 351 at an end of the first portion 351 on the opposite side from the focusing electrode 34.

The first tubular body 35 surrounds the heater 31, the cathode 32, the current adjustment electrode 33, the second tubular body 36, the plurality of support members, the stem 27, and the end 222*a* of the inner tubular portion 222 of the valve 22. That is, the heater 31, the cathode 32, the current adjustment electrode 33, the second tubular body 36, the plurality of support members, the stem 27, and the end 222*a* of the inner tubular portion 222 of the valve 22 are disposed in an inner region of the first tubular body 35. An annular gap is formed between the other end 35*b* of the first tubular body 35 in the direction parallel to the tube axis A and the end 222*a* of the inner tubular portion 222 of the valve 22. A width of the gap is, for example, about 5 mm.

The second tubular body 36 supports the focusing electrode 34 in the inner region of the first tubular body 35. The second tubular body 36 is made of metal (for example, stainless steel, etc.) and is formed in a tubular shape whose center line is the tube axis A. One end 36*a* of the second tubular body 36 in the direction parallel to the tube axis A is fixed to the focusing electrode 34, for example by welding. The other end 36*b* of the second tubular body 36 in the direction parallel to the tube axis A is fixed to the stem flange 26 by, for example, welding. The second tubular body 36 surrounds a portion located inside the housing 2 in the heater 31, the cathode 32, the current adjustment electrode 33, the plurality of support members, and the plurality of stem pins 28. That is, the portion located inside the housing 2 in the heater 31, the cathode 32, the current adjustment electrode 33, the plurality of support members, and the plurality of stem pins 28 is disposed in an inner region of the second tubular body 36. The second tubular body 36 is electrically connected to the corresponding stem pin 28 via the stem flange 26, and also functions as a power supply path for the focusing electrode 34. Note that the first tubular body 35 and the second tubular body 36 are electrically connected to the focusing electrode 34 to have the same potential as a potential of the focusing electrode 34.

The plurality of support members is disposed between the current adjustment electrode 33 and the focusing electrode 34. The plurality of support members is arranged at equal pitches with the tube axis A as a center line while being spaced apart from each other. Each support member is formed of an insulating material (for example, ceramic, etc.).

The target 4 is disposed inside the housing 2. Specifically, the target 4 is disposed on an inner surface of the window member 23 on the tube axis A. The target 4 generates X-rays R upon incidence of the electron beam B (electrons). The target 4 is formed in a film shape on the inner surface of the window member 23 using, for example, tungsten, molybdenum, copper, etc. The target 4 is electrically connected to the head 21. As an example, the target 4 and the head 21 are at ground potential.

Figure 3:
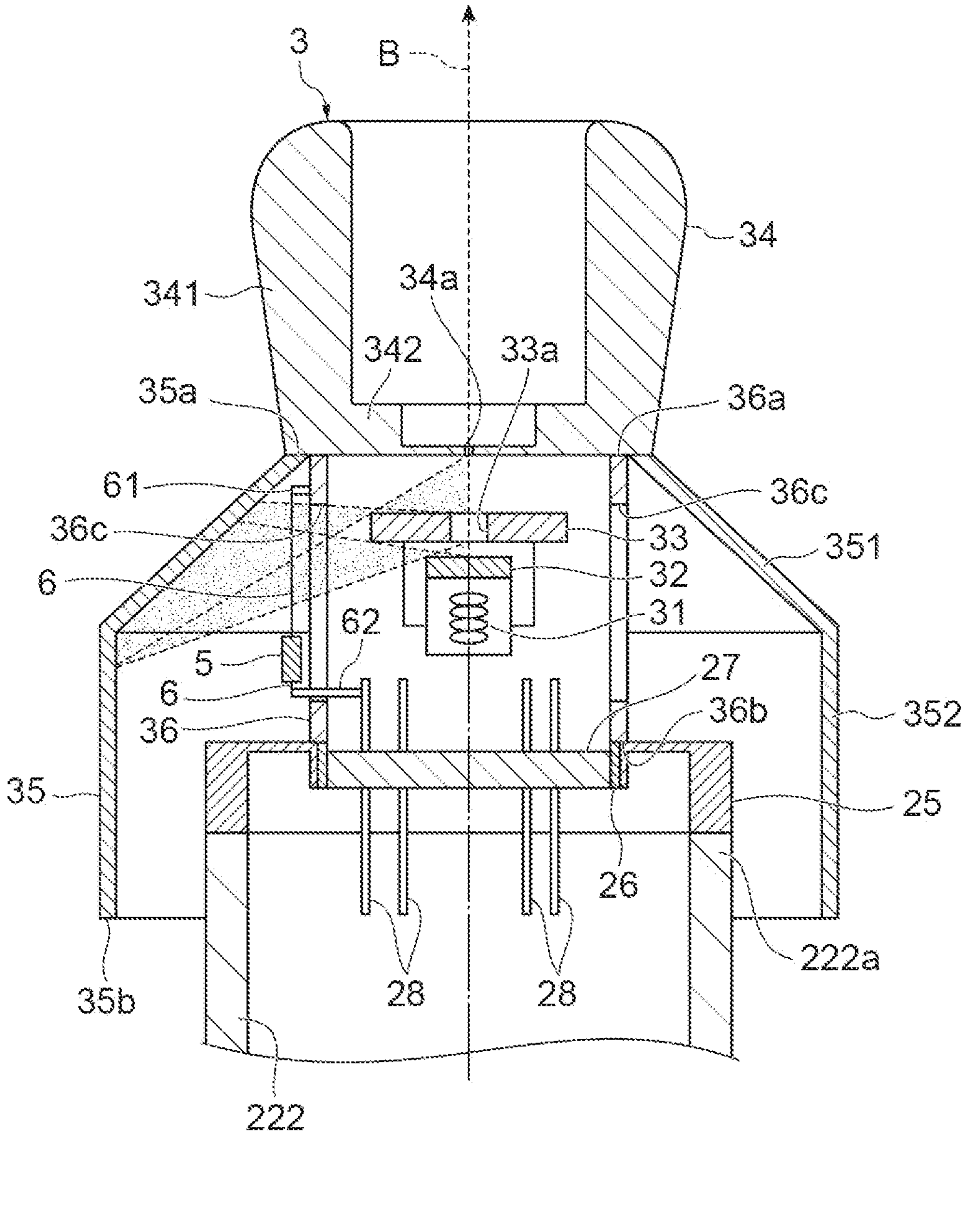
FIG. 3 is a cross-sectional view of an electron gun illustrated in FIG. 2.

As illustrated in FIG. 3, the getter 5 is disposed in a region where a trajectory of electrons from the cathode 32 to the target 4 cannot be seen in the inner region of the first tubular body 35. The trajectory of electrons from the cathode 32 to the target 4 means a center line of the electron beam B from the cathode 32 to the target 4, and coincides with a portion of the tube axis A connecting the cathode 32 and the target 4 to each other in this embodiment. The region where the trajectory of electrons from the cathode 32 to the target 4 cannot be seen means a region where a certain member is present on a line segment connecting "any point in the region" and "any point on the trajectory of electrons from the cathode 32 to the target 4." Meanwhile, a region where the trajectory of electrons from the cathode 32 to the target 4 can be seen means a region where any member is not present on a line segment connecting "any point in the region" and "any point on the trajectory of electrons from the cathode 32 to the target 4." In FIG. 3, a dot-hatched region is the region where the trajectory of electrons from the cathode 32 to the target 4 can be seen. A region occupied by the getter 5 is the region where the trajectory of electrons from the cathode 32 to the target 4 cannot be seen.

In this embodiment, the getter 5 is disposed in a region between the first tubular body 35 and the second tubular body 36, and faces one of a plurality of openings 36*c* formed in the second tubular body 36. In the second tubular body 36, each opening 36*c* opens to the inner region of the second tubular body 36 and an outer region of the second tubular body 36. The plurality of openings 36*c* is arranged at equal pitches with the tube axis A as a center line while being spaced apart from each other.

The getter 5 is supported by a pair of wires 6 in the region between the first tubular body 35 and the second tubular body 36. Each wire 6 is a metal wire. One wire 6 is stretched between the support member 61 and the getter 5. The support member 61 is a metal member protruding from the second tubular body 36 toward the first tubular body 35 side. The support member 61 is fixed to the second tubular body 36, for example by welding. One wire 6 is fixed to each of the support member 61 and the getter 5, for example, by welding. The other wire 6 is stretched between the support member 62 and the getter 5. The support member 62 is a metal member protruding from one of the stem pins 28 toward the first tubular body 35 side through an opening 36*c* facing the getter 5. The support member 62 is fixed to one of the stem pins 28, for example by welding. The other wire 6 is fixed to each of the support member 62 and the getter 5, for example by welding.

The getter 5 is a non-evaporable getter. The non-evaporable getter is a getter on which a surface capable of chemically adsorbing gas by being heated in a vacuum is formed. A material of the getter 5 is, for example, titanium, zirconium, vanadium, or an alloy containing these metals. For example, during manufacture of the X-ray tube 1, when the getter 5 is heated by electric conduction through one of the stem pins 28, the support member 62, and the other wire 6 while a space inside the housing 2 is evacuated, the getter 5 is activated (that is, a surface capable of chemically adsorbing gas is formed).

In the X-ray tube 1 configured as described above, a negative high voltage with reference to potentials of the target 4 and the head 21 is applied to the electron gun 3 by the power supply 12. As an example, the power supply 12 applies a negative high voltage (for example, −10 kV to −500 kV) to each part of the electron gun 3 via the power feeder 13 and each stem pin 28 while the target 4 and the head 21 are at ground potential. The electron beam B emitted from the electron gun 3 is focused on the target 4 along the tube axis A. The X-rays R generated in a radiation region of the electron beam B on the target 4 are emitted to the outside through the target 4 and the window member 23, with the radiation region as a focus.

During operation of the X-ray tube 1, the cathode 32 and the target 4 become high temperature (for example, about 1000° C.). Therefore, a member near the cathode 32 heated by radiant heat of the cathode 32 (for example, ends, etc. of the current adjustment electrode 33 and the focusing electrode 34 on the cathode 32 side) and the target 4 may release gas into the housing 2. In that case, gas released from the member near the cathode 32 tends to stay in the inner region of the first tubular body 35, and gas released from the target 4 is less likely to enter the inner region of the first tubular body 35. A reason therefor is that the inner region of the first tubular body 35 and the outer region of the first tubular body 35 communicate each other through a narrow region (that is, the through hole 34*a* of the focusing electrode 34, and an annular gap between the other end 35*b* of the first tubular body 35 and the end 222*a* of the inner tubular portion 222 of the valve 22). Therefore, gas released from the member near the cathode 32 is likely to be adsorbed by the getter 5 in the inner region of the first tubular body 35, and gas released from the target 4 is less likely to adhere to the cathode 32.

[Action and Effect]

In the X-ray tube 1, the getter 5 is disposed in the inner region of the first tubular body 35 surrounding the cathode 32. In this way, in the inner region of the first tubular body 35, gas released from the member near the cathode 32 can be efficiently adsorbed by the getter 5. Further, in the inner region of the first tubular body 35, the getter 5 is disposed in the region where the trajectory of electrons from the cathode 32 to the target 4 cannot be seen. In this way, it is possible to inhibit gas adsorbed by the getter 5 from being re-released from the getter 5 to the inner region of the first tubular body 35 due to electrons colliding with the getter 5. Therefore, according to the X-ray tube 1, it is possible to suppress deterioration of the cathode 32 due to adhesion of gas.

In the X-ray tube 1, the plurality of openings 36*c* is formed in the second tubular body 36 that supports the focusing electrode 34 and surrounds the cathode 32 in the inner region of the first tubular body 35, and the getter 5 is disposed in the region between the first tubular body 35 and the second tubular body 36. In this way, the getter 5 can be allowed to properly operate by inhibiting the getter 5 from being excessively heated by radiant heat of the heater 31 disposed in the inner region of the second tubular body 36, and inhibiting the getter 5 from coming into contact with a wire disposed in the inner region of the second tubular body 36. Note that, when the getter 5 is excessively heated by radiant heat of the heater 31, there is concern that gas adsorbed by the getter 5 may be re-released from the getter 5 to the inner region of the first tubular body 35 due to desorption.

Furthermore, when the getter 5 comes into contact with the wire, there is concern that a voltage may not be appropriately applied to each part of the X-ray tube 1.

In the X-ray tube 1, the getter 5 faces the opening 36*c* formed in the second tubular body 36. In this way, gas released from the member near the cathode 32 can be efficiently adsorbed by the getter 5 via the opening 36*c*. In addition, when the getter 5 is activated during manufacture of the X-ray tube 1, it is possible to suppress escape of heat through the second tubular body 36 due to heat conduction, and thus the getter 5 can be efficiently and uniformly heated.

In the X-ray tube 1, the first tubular body 35 and the second tubular body 36 are electrically connected to the focusing electrode 34 so as to have the same potential as a potential of the focusing electrode 34. In this way, an electric field around the cathode 32 can be stabilized, and the cathode 32 can be allowed to properly function.

In the X-ray tube 1, the getter 5 is supported by the wire 6 in the inner region of the first tubular body 35. In this way, by increasing the surface area of the getter 5 exposed to the inner region of the first tubular body 35, gas released from the member near the cathode 32 can be efficiently adsorbed by the getter 5.

In the X-ray tube 1, the getter 5 is a non-evaporable getter. In this way, by forming the getter 5 in a block shape, it is possible to increase the surface area of the getter 5 exposed to the inner region of the first tubular body 35.

MODIFIED EXAMPLE

Figure 4:
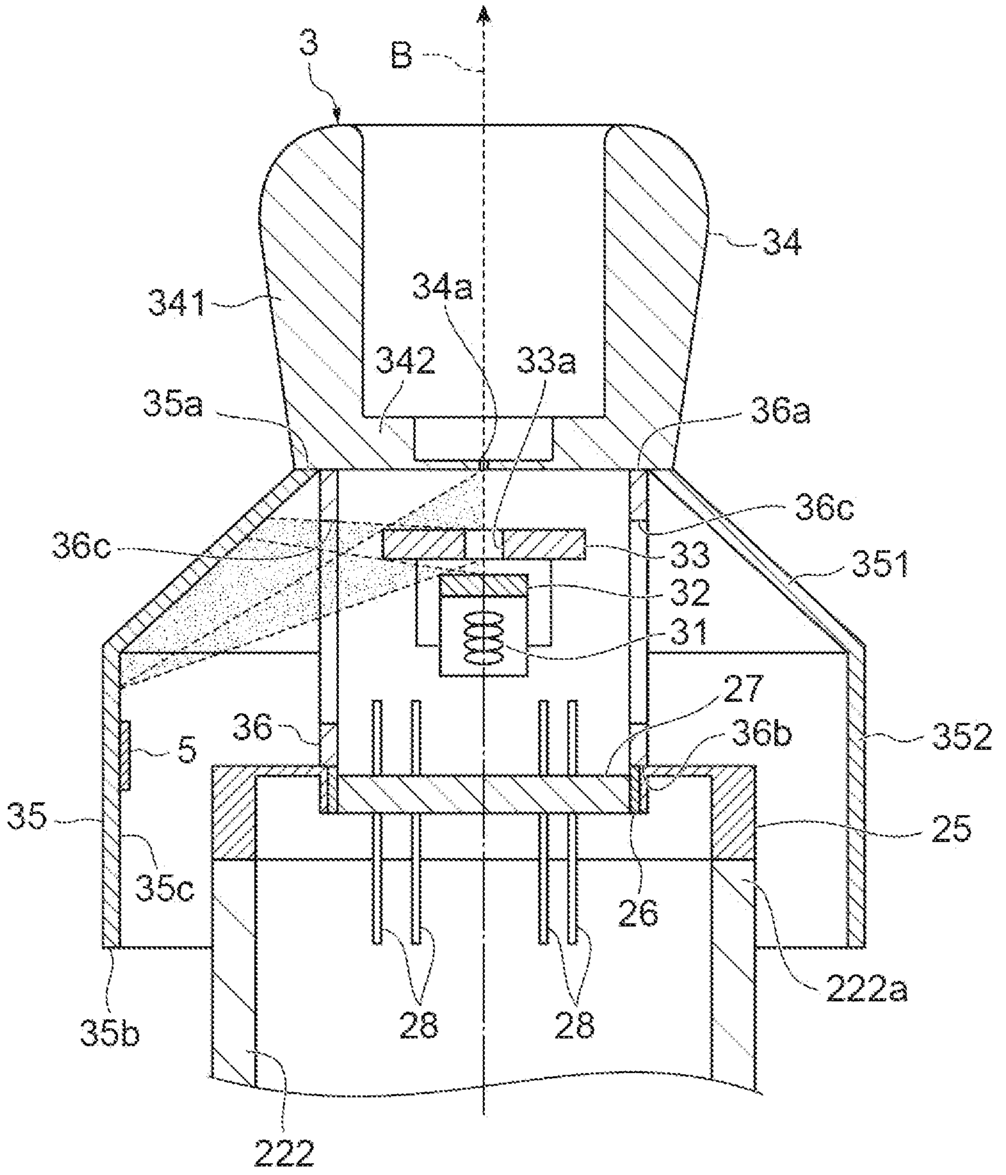
FIG. 4 is a cross-sectional view of an electron gun of an X-ray tube of a modified example.

The present disclosure is not limited to the above embodiments. For example, as illustrated in FIG. 4, the getter 5 may be formed in a film shape on an inner surface 35*c* of the first tubular body 35. In this way, the first tubular body 35 can be made smaller. In that case, the getter 5 may be an evaporable getter. The evaporable getter is a getter that utilizes a gas adsorption effect of a metal thin film produced by evaporation or sputtering. A material of the getter 5 is, for example, barium.

Furthermore, the getter 5 disposed in the region between the first tubular body 35 and the second tubular body 36 may not face the opening 36*c* formed in the second tubular body 36. Furthermore, when the getter 5 is disposed in the region where the trajectory of electrons from the cathode 32 to the target 4 cannot be seen in the inner region of the first tubular body 35, the getter 5 may not be disposed in the region between the first tubular body 35 and the second tubular body 36. The getter 5 may be supported by a member other than the wire 6. Further, the X-ray tube 1 may be configured as a sealed reflection type X-ray tube.

An X-ray tube of an aspect of the present disclosure is [1] "an X-ray tube including a housing, a cathode disposed in the housing and configured to release electrons, a target disposed in the housing and configured to generate X-rays upon incidence of the electrons, a first tubular body surrounding the cathode inside the housing, and a getter disposed in a region where a trajectory of the electrons from the cathode to the target is not allowed to be seen in an inner region of the first tubular body".

In the X-ray tube described in the item [1], the getter is disposed in the inner region of the first tubular body surrounding the cathode. In this way, in the inner region of the first tubular body, gas released from a member near the cathode can be efficiently adsorbed by the getter. Further, the inner region of the first tubular body, the getter is disposed in the region where the trajectory of electrons from the cathode to the target cannot be seen. In this way, it is possible to inhibit gas adsorbed by the getter from being re-released from the getter to the inner region of the first tubular body due to electrons colliding with the getter. Therefore, according to the X-ray tube described in the item [1], it is possible to suppress deterioration of the cathode due to adhesion of gas.

An X-ray tube of an aspect of the present disclosure may be [2] "the X-ray tube described in the item [1], further including a focusing electrode disposed in the housing and configured to focus the electrons released from the cathode onto the target, and a second tubular body supporting the focusing electrode and surrounding the cathode in the inner region of the first tubular body, wherein at least one opening is formed in the second tubular body and is opening to an inner region of the second tubular body and an outer region of the second tubular body, and the getter is disposed in a region between the first tubular body and the second tubular body". According to the X-ray tube described in the item [2], the getter can be allowed to properly operate by, for example, inhibiting the getter from being excessively heated by radiant heat of the heater disposed in the inner region of the second tubular body, and by, inhibiting the getter from coming into contact with a wire disposed in the inner region of the second tubular body. Note that, when the getter is excessively heated by radiant heat of the heater, there is concern that gas adsorbed by the getter may be re-released from the getter to the inner region of the first tubular body due to desorption. Furthermore, when the getter comes into contact with the wire, there is concern that a voltage may not be appropriately applied to each part of the X-ray tube.

An X-ray tube of an aspect of the present disclosure may be [3] "the X-ray tube described in the item [2], wherein the getter faces the opening". According to the X-ray tube described in the item [3], gas released from the member near the cathode can be efficiently adsorbed by the getter via the opening.

An X-ray tube of an aspect of the present disclosure may be [4] "the X-ray tube described in the item [2] or [3], wherein the first tubular body and the second tubular body are electrically connected to the focusing electrode to have the same potential as a potential of the focusing electrode". According to the X-ray tube described in the item [4], an electric field around the cathode can be stabilized, and the cathode can be allowed to properly function.

An X-ray tube of an aspect of the present disclosure may be [5] "the X-ray tube described in any one of the items [1] to [4], further including a wire supporting the getter in the inner region of the first tubular body". According to the X-ray tube described in the item [5], by increasing the surface area of the getter exposed to the inner region of the first tubular body, gas released from the member near the cathode can be efficiently adsorbed by the getter.

An X-ray tube of an aspect of the present disclosure may be [6] "the X-ray tube described in the item [5], wherein the getter is a non-evaporable getter". According to the X-ray tube described in the item [6], by forming the getter in a block shape, it is possible to increase the surface area of the getter exposed to the inner region of the first tubular body.

An X-ray tube of an aspect of the present disclosure may be [7] "the X-ray tube described in any one of the items [1] to [4], wherein the getter is formed in a film shape on an inner surface of the first tubular body". According to the X-ray tube described in the item [7], the first tubular body can be made smaller.

According to the present disclosure, it is possible to provide an X-ray tube capable of suppressing deterioration of the cathode.

What is claimed is:

1. An X-ray tube comprising:
- a housing;
- a cathode disposed in the housing and configured to release electrons;
- a target disposed in the housing and configured to generate X-rays upon incidence of the electrons;
- a first tubular body surrounding the cathode inside the housing; and
- a getter disposed in a region where a trajectory of the electrons from the cathode to the target is not allowed to be seen in an inner region of the first tubular body,
- wherein the first tubular body is disposed in the housing, and
- wherein the cathode is disposed in the inner region of the first tubular body.

2. The X-ray tube according to claim 1, further comprising:

a focusing electrode disposed in the housing and configured to focus the electrons released from the cathode onto the target; and a second tubular body supporting the focusing electrode and surrounding the cathode in the inner region of the first tubular body, wherein at least one opening is formed in the second tubular body and is opening to an inner region of the second tubular body and an outer region of the second tubular body, and the getter is disposed in a region between the first tubular body and the second tubular body.

3. The X-ray tube according to claim 2, wherein the getter faces the opening.

4. The X-ray tube according to claim 2, wherein the first tubular body and the second tubular body are electrically connected to the focusing electrode to have the same potential as a potential of the focusing electrode.

5. The X-ray tube according to claim 2, wherein the focusing electrode and the first tubular body together define the inner region of the first tubular body.

6. The X-ray tube according to claim 2, wherein the inner region of the first tubular body and an outer region of the first tubular body communicate with each other through a through hole of the focusing electrode and a gap between an end of the first tubular body on an opposite side from the focusing electrode and the housing.

7. The X-ray tube according to claim 1, further comprising a wire supporting the getter in the inner region of the first tubular body.

8. The X-ray tube according to claim 7, wherein the getter is a non-evaporable getter.

9. The X-ray tube according to claim 1, wherein the getter is formed in a film shape on an inner surface of the first tubular body.

* * * * *